9380X
C. M. Peckham,
Molasses Gate,
Patented Feb. 10, 1836.
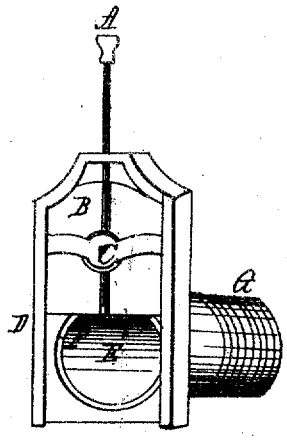

av 16

9380X Feb 10 1836.

Charles W. Peckham, of New Haven. Conn:
Letters Patent.

The Schedule referred to in these Letters Patent and making part of the same, containing a description in the words of the said Charles W. Peckham himself of his improvement in the Faucet for drawing molasses and other liquids –

To all to whom these presents shall come: Be it known that I Charles Wiley Peckham, of New Haven, in the County of New Haven in the State of Connecticut, have invented a new and useful improvement in Molasses gates which I call "Peckhams improved molasses gates" & that the following is a full & exact description thereof – My improved molasses gate is made of block tin or other composition of metal & consists of a tapering pipe or tube, armed with the thread of a screw, about half of its length on the smallest end, by which it may be screwed in & made fast in a hole made for that purpose, in the head of the vessel or cask to which it is applied. This pipe or tube for hogsheads is about four inches long & one & a quarter inch in diameter, and may be proportionally less for smaller casks –

This pipe or tube is in common use & I claim no improvement therein, but my improvement consists in the gate attached to the pipe. This gate consists of four parts viz. the head, the slide, the spring & the piston & knob, these parts except the spring are cast separately in suitable moulds. The head for hogshead gates is a plate of metal about one eighth of an inch thick, about two inches broad, & four or five inches in height the sides and top being turned up & over so as to form a lip & ledge to guide & hold the spring & rod hereafter described, near the lower end of this head an orifice is made to receive the mouth of the pipe or tube. This orifice is larger than the mouth of the pipe & the head plate rests on a ring or ledge on the tube, to which it is firmly soldered on the back side, bringing the mouth of the tube exactly even with the front face of the head & leaving in front a hollow space between the end of the pipe & the front face of the head to be filled with a ring of pliable leather as a valve to press on the slide & prevent leaking –

The slide is a flat piece or plate of metal, broad enough to fill the space 212. 9380X between the lips or side ledges of the head & raising half the height of the head
& so as fully to cover when shut, the mouth of the pipe & the leather ring around
it & when raised will leave the mouth of the pipe open - the back side of this
plate or slide is made quite smooth & on the front side of it, are ledges
to receive & hold the spring. The spring I make of brass, iron or steel, & is a flat
piece about half an inch broad & long enough to reach to and play freely
between the lips or ledges on the sides of the head piece. & is bent elliptically so
that when in place the ends will press upon the lips & ledges of the head,
while the bowing centre of the spring will press the sliding plate against the
leather ring, around the mouth of the pipe & prevent all leaking.

From the top of the sliding plate or gate a piston or rod rises, passing thro' a
hole in the top ledge of the head to guide & keep it steady & terminates in a
knob, by which the slide or gate is moved up or down; so as to open or close
the mouth of the pipe at pleasure — -

These several parts being put together and the leather ring or valve inserted
in the manner above described, form a faucet peculiarly adapted to the draft
of molasses or any similar liquors & may be used for water or other liquids —
It is preferable to all others in use, in this, that it is simple in its construction
& its several parts are visible & accessible. For a further illustration of my in-
vention, I refer to the model and drawings of the same deposited in the Patent
office — What I claim as my invention & not previously known in the above
described machine, is the application of the spring and the manner of its appli-
-cation as above specified, & therefore I solicit Letters Patent according to the laws
in such case provided — Dated at New Haven August 26th 1835.

Witnesses
Simeon Baldwin
W. T. Petrose

Charles W. Peckham

[illegible]

Drawings

[illegible]